United States Patent [19]
Tillin et al.

[11] Patent Number: 5,990,991
[45] Date of Patent: Nov. 23, 1999

[54] TWISTED LIQUID CRYSTAL SURFACE MODE DEVICE

[75] Inventors: Martin David Tillin, Abingdon; Michael John Towler, Botley, both of United Kingdom

[73] Assignee: Sharp Kabushiki Kaisha, Osaka, Japan

[21] Appl. No.: 08/880,456

[22] Filed: Jun. 24, 1997

[30] Foreign Application Priority Data

Jun. 26, 1996 [GB] United Kingdom .................. 9613364

[51] Int. Cl.$^6$ .................. G02F 1/1347; G02F 1/141; G02F 1/1335; G02F 1/133
[52] U.S. Cl. .................. 349/78; 349/136; 349/99; 349/33
[58] Field of Search .................. 349/78, 77, 74, 349/136, 99, 33, 128

[56] References Cited

U.S. PATENT DOCUMENTS

| | | | |
|---|---|---|---|
| 4,097,128 | 6/1978 | Matsumoto et al. | 349/78 |
| 4,231,639 | 11/1980 | Banda | 350/335 |

(List continued on next page.)

FOREIGN PATENT DOCUMENTS

| | | | |
|---|---|---|---|
| 0377757 | 7/1990 | European Pat. Off. | G02F 1/133 |
| 0434000 | 6/1991 | European Pat. Off. . | |
| 0481700 | 10/1991 | European Pat. Off. . | |
| 0467456 | 1/1992 | European Pat. Off. . | |
| 0600541 | 6/1994 | European Pat. Off. . | |
| 0793133 | 9/1997 | European Pat. Off. | G02F 1/1335 |
| 06243471 | 9/1994 | Japan . | |
| 2276730 | 10/1994 | United Kingdom . | |
| 2286056 | 8/1995 | United Kingdom . | |
| 9009614 | 8/1990 | WIPO . | |

OTHER PUBLICATIONS

Itoh Y et al: "A double–layer electrically controlled birefringence . . . "/Japanese Journal of Applied Physics/Jul. 15, 1991 vol. 30 No. 7B pp. L1296–L1299.

Saito S: "Viewing angle characteristics of ECB . . . "/ Molecular Crystals and Liquid Crystals, 1986, UK/vol. 138 No. 1–4 pp. 187–210.

Takahashi T et al: "Improvement of Multiplexability of double–layered . . . "/Electronics & Communications In Japan/Part 2 (Electronics), Dec. 1991, USA. vol. 74, No. 2 pp. 49–58.

Kvoc et al: "Wide–viewing–angle reflective . . . "/Proceedings of 15$^{th}$ Int. Display Research Conference Asia Display . . . Oct. 16–18, 1995 pp. 135–138.

S. Palmer; Applied Optics, May 1, 1996, vol. 35, No. 3, "Optical Angular Properties of Twisted–Nematic Liquid–Crystal Cells with Twist Angles of Less Than 90°".

Search Report for Application No. GB 9613364.0; Dated Sep. 26, 1996.

(List continued on next page.)

*Primary Examiner*—William L. Sikes
*Assistant Examiner*—Tarifur R. Chowdhury

[57] ABSTRACT

A twisted liquid crystal device includes a liquid crystal layer and first and second alignment layers disposed in opposite sides of the liquid crystal layer. The first and second alignment layers have respective alignment directions which are mutually inclined. A first linear polarizer is disposed on the opposite side of the first alignment layer to the liquid crystal layer. Electrodes apply a variable voltage across the liquid crystal layer which has a twisted liquid crystal structure and is arranged for operation in a surface switching mode with first and second regions of the liquid crystal layer adjacent the alignment layers being mutually optically de-coupled so as to act, within the liquid crystal layer, when in use, like a pair of separate, active optical retarders having mutually inclined optic axes and optical retardations which can be varied within a range to cause color.

44 Claims, 12 Drawing Sheets

U.S. PATENT DOCUMENTS

| | | | |
|---|---|---|---|
| 4,241,339 | 12/1980 | Ushiyama | 340/702 |
| 4,378,955 | 4/1983 | Bleha, Jr. et al. | 350/334 |
| 4,385,806 | 5/1983 | Fergason | 350/347 |
| 4,566,758 | 1/1986 | Bos | 349/136 |
| 4,635,051 | 1/1987 | Bos | 340/757 |
| 4,688,900 | 8/1987 | Doanne | 350/347 |
| 4,767,190 | 8/1988 | Dir et al. | 350/339 |
| 4,842,379 | 6/1989 | Oishi et al. | 350/347 |
| 4,923,286 | 5/1990 | Grupp | 350/340 |
| 4,952,029 | 8/1990 | Hayashi et al. | 349/76 |
| 5,090,794 | 2/1992 | Hatano et al. | 359/53 |
| 5,124,824 | 6/1992 | Kozaki et al. | 359/73 |
| 5,126,868 | 6/1992 | Kizaki et al. | 359/86 |
| 5,145,546 | 9/1992 | Yuasa et al. | 156/324 |
| 5,221,978 | 6/1993 | Heynderickx et al. | 349/76 |
| 5,231,521 | 7/1993 | Johnson et al. | 359/93 |
| 5,243,455 | 9/1993 | Johnson et al. | 359/93 |
| 5,280,375 | 1/1994 | Tsuda et al. | 359/76 |
| 5,343,313 | 8/1994 | Fergason | 359/83 |
| 5,414,541 | 5/1995 | Patel et al. | 359/39 |
| 5,440,413 | 8/1995 | Kikuchi et al. | 359/73 |
| 5,496,498 | 3/1996 | Toyooka et al. | 252/299.01 |
| 5,570,211 | 10/1996 | Hanaoka et al. | 359/53 |
| 5,680,184 | 10/1997 | Nishino | 349/78 |
| 5,745,206 | 4/1998 | Koike et al. | 349/129 |
| 5,764,325 | 6/1998 | Bryan-Brown et al. | 349/123 |
| 5,796,459 | 8/1998 | Bryan-Brown et al. | 349/132 |
| 5,808,716 | 9/1998 | Gass et al. | 349/124 |
| 5,880,798 | 3/1999 | Walton et al. | 349/99 |

OTHER PUBLICATIONS

S. Pancharatnam, Proc. Ind. Acad Sci., vol. 41a, pp. 130–136, 1955, "Achromatic Combintions of Birefringent Plates, Part I".

S. Pancharatnam, Proc. Ind. Acad Sci., vol. 41a, pp. 137–144, 1955, "Achromatic Combinations of Birefringent Plates, Part II".

P. D. Berezin et al., Sov. J. Quant. Electron., vol. 3, No. 1, pp. 78–79, 1973, "Electroopic Switching In Oriented Liquid–Crystal Films".

P.J. Bos et al., Mol. Cryst. Liq. Cryst., vol. 113, pp. 329–339, 1984, "The pi–Cell: A Fast Liquid–Crystal Optical–Switching Device".

A. Sato, Display Devices, pp. 18–21, 1994, Reflection Formats for Color LCDs Solve Power–Consumption Problems.

G.D. Sharp et al., SID 93 Digest, pp. 665–668, 1993, "P–60: Color Switching Using Ferroelectric Liquid Crystals".

TWISTED LIQUID CRYSTAL SURFACE MODE DEVICE

This invention relates to liquid crystal devices and is more particularly concerned with fast switching colour liquid crystal devices for use in liquid crystal displays, such as for example televisions, computer screens, 3-D displays, virtual reality displays and also optical systems requiring fast polarisation switches, spatial light modulators or optical shutters (e.g. for optical communications). The present invention is particularly, but not exclusively, concerned with bright reflective liquid crystal displays.

Nematic liquid crystals have been used as variable optical retarders for many years. However, all have essentially the same chromatic properties and there has been a long-felt need to improve the chromaticity gamut of such devices.

Achromatic combinations of birefringent plates used to produce an achromatic circular polariser are disclosed in Proc. Ind. Acad Sci., 1955, 41a, page 130, whilst Proc. Ind. Acad. Sci., 1955, 41a, page 137 discloses achromatic combinations of birefringent plates which form an achromatic quarter wave plate. These achromatic retarders are made from combinations of retarders with different azimuthal orientations of their optic axes. A method for calculating the required retardations and angles is also given. The first mentioned paper details the use of two half wave plates and a quarter wave plate to make a passive achromatic circular polariser. These are known as Pancharatnam or combination retarders.

Sov. J. Quant. Electron., 1973, 3, pages 78 and 79 discloses electro-optic switching in oriented liquid crystal layers in which aligned liquid crystal molecules are switched at high electric fields. Fast response times are obtained due to the quick relaxation of surface regions which are re-oriented by the high electric fields. Thus, this is a disclosure relating to so-called "surface switching mode" liquid crystal layers.

So-called pi-cells are disclosed in Mol. Cryst. Liq. Cryst., 1984, 113, pages 329 to 339, for use in a fast liquid crystal optical switching device. The pi-cell is formed from liquid crystal molecules aligned by parallel rubbed surfaces and operates above a certain threshold voltage, above which it is energetically favourable for the directors of the liquid crystal molecules to take up a configuration called the V state. The director configuration in the centre of the cell bears some resemblance to that of other liquid crystal cells at high voltages in that, as the field is increased, re-orientation of the liquid crystal directors (switching) occurs in the regions near the surfaces of the cell, and the directors in the centre of the cell can be considered to be homeotropic (i.e. substantially perpendicular to the substrates). The response time of pi-cells is very fast (sub-millisecond) compared to twisted nematic devices.

U.S. Pat. No. 4,385,806 discloses a liquid crystal display with improved angle of view and response times. Improved response times are obtained from an anti-parallel aligned display which is driven at high voltages to cause a re-orientation of surface regions of the liquid crystal layer, i.e. regions of the liquid crystal layer near to the alignment surfaces of the cell. The alignment surfaces in the displays of U.S. Pat. No. 4,385,806 induce azimuthal alignment of the liquid crystal molecules in the same direction in these surface regions. Such a display suffers from much the same disadvantage as that noted above for the pi-cell.

GB-A-2286056 discloses a pi cell device which is used in birefringent mode as a sequential colour display or shutter.

Display Devices, 1994, 18, "Reflection formats for colour LCDs", is a review paper which discloses the use of twisted nematic and supertwisted nematic LCDs in single or double polariser reflective mode to produce a bright reflective colour display. Whilst no specific examples are given, the principle of using defined twist angles at certain voltages to generate colour is described. The devices rely on the well known property of doped supertwisted nematic displays to produce interference colours. Enhanced chromaticity compared to normal twisted nematic and supertwisted nematic devices is not shown.

WO90/09614 discloses liquid crystal devices using a linear electro-optic effect. Various embodiments are disclosed in which ferroelectric or electroclinic devices (either singly, in multiples, or with additional passive optical retarders) are used either to reduce or enhance the chromatic response of the device. In all examples, switching of the optic axis is in the plane of the device and each liquid crystal layer defines only a single optical retarder element.

U.S. Pat. No. 5,231,521 discloses chiral smectic liquid crystal polarisation interference filters which are tunable wavelength filters of specific bandwidth. Like certain of the above-described known devices, switching of the optic axis is in the plane of the device and each liquid crystal layer only acts as a single optical retarder.

U.S. Pat. No. 5,243,455 and SID Digest, 1993, 665, "Colour switching using ferroelectric liquid crystals", disclose chiral smectic polarisation interference filters which are discretely or continuously tunable. Such filters comprise either ferroelectric (chiral smectic C) or electroclinic (chiral smectic A) liquid crystal molecules. Blocking filters useful in colour generation are described. As with certain of the above-described devices, switching of the optic axis is in the plane of the device and each active element defined by the liquid crystal layer acts only as a single optical retarder.

It is an object of the present invention to provide a fast switching liquid crystal device having enhanced chromaticity.

According to the present invention, there is provided a twisted liquid crystal device comprising a liquid crystal layer, first and second alignment layers disposed on opposite sides of the liquid crystal layer, the first and second alignment layers having respective alignment directions which are mutually inclined, a first linear polariser disposed on the opposite side of the first alignment layer to the liquid crystal layer, and means for applying a variable voltage across the liquid crystal layer, the liquid crystal layer having a twisted nematic liquid crystal structure and being arranged for operation in surface switching mode with first and second regions of the liquid crystal layer adjacent the first and second alignment layers acting, in use, like a pair of active optical retarders having mutually inclined optic axes (the slow axes) and whose retardations which can be varied within a range to produce colour.

The device of the present invention uses liquid crystals in a birefringent mode to produce colour. Varying the voltage applied to the device causes the optical path length to change, and hence the colour produced by the device to be altered. A uniaxial birefringent material of thickness d between crossed polarisers with its optic axis at an angle θ to the polarisation axis of the input linear polariser has a transmission which is given by $$I = I_0 \cdot \sin^2(2\theta) \cdot \sin^2\left(\frac{\pi \cdot d \cdot \Delta n}{\lambda}\right)$$

where $\lambda$ is the wavelength of the light under consideration, and $\Delta n$ is the birefringence of the liquid crystal material and is wavelength dependent. This leads to an intensity which has a $\sin^2$ dependence with wavenumber. The resulting intensity maxima occur at $d.\Delta n=(2n+1).\lambda/2$ and have a significant half width, thus giving a limited range of hue that can be generated by the device. The device of the present invention uses the principle of combinations of optical retarders (or waveplates) which have optical retardations of larger values than $\lambda/2$, such that the total optical retardation is of a suitable value to produce colour. The present invention enables improved chromaticity with variable hue to be achieved with a single liquid crystal layer, which is operated between two finite voltages such that the first and second regions are sufficiently decoupled (so-called "surface switching").

It is preferred for the device to be arranged such that, in use, the first and second regions act like a pair of active optical retarders which are sufficiently optically de-coupled. Optical de-coupling to a sufficient extent takes place when the liquid crystal director (i.e. the averaged orientation of the long molecular axis of the liquid crystal molecules) in an intermediate region of the liquid crystal layer, between the first and second regions, is at a tilt angle of greater than 70° relative to the first and second alignment layers. Such optical decoupling of the first and second regions of the liquid crystal layer in the device according to the present invention can be achieved by applying a sufficient voltage across the liquid crystal layer to cause the liquid crystal director tilt angle in the intermediate region to exceed 70°. The voltage at which this takes place is determined by the physical properties of the liquid crystal material as well as the geometry of the liquid crystal cell. The optical path difference ($d.\Delta n$—where d is the thickness and $\Delta n$ is the birefringence of the liquid crystal layer) is a determining factor. It is presently believed that $d.\Delta n$ (at zero field) should be greater than about 3.4 $\mu$m to obtain colour in the blue, green and red regions of the visible spectrum, although a $d.\Delta n$ value of at least 2.0 $\mu$m is possible in the event that enhanced colour from just the blue region of the visible spectrum is needed. No absolute upper limit can be defined since this will vary depending upon factors such as the nature of the liquid crystal material. For high birefringence liquid crystal materials (e.g. BL037, $\Delta n=0.28$), a $d.\Delta n$ limit of about 4.2 $\mu$m is appropriate, whereas for low birefringence liquid crystal materials (e.g. ZLI-4792, $\Delta n=0.097$) a $d.\Delta n$ limit of about 3.4 $\mu$m is appropriate. In terms of the thickness (d) of the liquid crystal layer (i.e. the cell thickness), this equates to d>about 15 $\mu$m (more preferably >about 20 $\mu$m for good optical effect) for high birefringence liquid crystal materials, and d>about 35 $\mu$m (more preferably >about 45 $\mu$m for good optical effect) for low birefringence liquid crystal materials.

The term "alignment direction" as used herein relates to that of the director (i.e. the direction of orientation of the liquid crystal molecule) at the surface of the alignment layer under consideration. The orientation of a liquid crystal molecule at any point in space is generally described by the unit vector termed the director:

$\hat{\underline{n}}=(n_x,n_y,n_z)$ where $n_x$, $n_y$, and $n_z$ are the respective vectors on three mutually perpendicular axes x, y and z of the laboratory frame, in which x and y are in the plane of the alignment layer and z is parallel to the normal of the plane of the alignment layer.

Similarly, the liquid crystal director at a surface can be defined as:

$\hat{\underline{n}}_s=(n_{xs},n_{ys},n_{zs})$

Then, for a defined surface-normal parallel to the z-axis, each alignment direction within a cell is given by:

$$\hat{\underline{d}} = s_z \cdot \frac{n_{zs}}{|n_{zs}|} \cdot \frac{(n_{xs}, n_{ys})}{\sqrt{n_{xs}^2 + n_{ys}^2}}$$

where $\hat{\underline{s}}$ is the unit surface-normal vector extending perpendicularly from the alignment surface into the liquid crystal layer.

In the special case where there is no pretilt ($n_{zs}=0$), then
$\hat{\underline{d}}=(n_{xs},n_{ys})$ or $\hat{\underline{d}}=(n_{xs},-n_{ys})$
which are equivalent configurations.

For example, when a liquid crystal surface is aligned by rubbing using buffing means, the alignment direction is given by the direction in which the buffing means moves across the alignment surface from the initial point of contact therewith, tilted out of the surface by an amount equal to the pretilt so generated.

The term "active" as used herein in relation to the optical retarders is intended to mean that the optical retardation can be changed (by varying the voltage applied across the liquid crystal layer), as opposed to a passive optical retardation plate whose optical retardation is fixed.

The optical decoupling effect may be enhanced by the provision of a transparent divider (eg a thin transparent membrane) serving to separate the first and second regions of the liquid crystal layer physically from one another.

At least one surface of the divider may be rubbed or otherwise aligned to provide a zero pretilt (planar) or a 90° pretilt (homeotropic) with the latter being preferred for ease of achievement in practice. The alignment direction on at least one surface of the divider may be parallel or anti-parallel to that of the respective facing alignment layer, inducing a Freedericksz- or a pi-cell structure.

Alternatively, the alignment direction on at least one surface of the divider may be inclined with respect to that of the respective facing alignment layer in a similar way to that in which the alignment directions of the first and second alignment layers are mutually inclined. This alternative arrangement permits excellent chromaticity to be achieved within one device, rather than requiring two actively driven cells.

For devices intended to be operated in transmissive mode, the device will further comprise a second polariser which is disposed on the opposite side of the second alignment layer to the liquid crystal layer and which has a polarisation axis disposed at an angle relative to the alignment direction of the second alignment layer.

In general, for transmission mode devices, and preferably where the polarisation directions of the first and second polarisers are mutually parallel, if $\beta$ is the angle between the polarisation or absorption axis of the first liner polariser and the alignment direction of the first alignment layer, then the alignment direction of the second alignment layer is at an angle of substantially $3\beta$ to the polarisation or absorption axis of the first linear polariser.

For devices intended to be operated in a reflective mode, a reflector will be disposed on the opposite side of the second alignment layer to the liquid crystal layer. The reflector may act as an electrode.

In general, for reflective mode devices, if $\beta$ is the angle between the polarisation or absorption axis of the linear polariser and the alignment direction of the first alignment layer, then the alignment direction of the second alignment layer is at an angle of substantially (2β+45°) relative to the polarisation or absorption axis of the linear polariser.

The liquid crystal molecules in the first and second regions may have equal or unequal pretilt angles. Thus, instead of the first and second regions being operated so as to have equal optical retardations, one surface region could have an optical retardation which is different to that of the other, e.g. twice that of the other. Such a combination can be used for operation of the liquid crystal display in reflective mode. Unequal pretilt angles can be achieved, for example, by forming the alignment layers of different materials and/or by performing different rubbing or other alignment procedures on the two alignment layers.

In one convenient embodiment, for operation in transmissive mode, the alignment directions of the first and second alignment layers are mutually inclined at an angle of 45°±about 15° or 135°±about 15°, and the pretilt angles of the liquid crystal molecules adjacent the alignment layers are similar. Whilst the best results are obtainable with pretilt angles in the first and second regions which produce, in use, an effective optical retardation ratio of 1.0, it is considered that acceptable results can be achieved if such ratio is from 0.85 to 1.15. The alignment direction of the first alignment layer in this embodiment is most preferably disposed at an angle of 22.5°±about 15° relative to the polarisation or absorption axis of said first linear polariser.

In another convenient embodiment, for operation in reflective mode, the alignment directions of the alignment layers are mutually inclined at an angle of 60°±about 15° or 120°±about 15°, the pretilt angles of the liquid crystal molecules adjacent the alignment layers are different, and the device is operated so that the optical retarder defined by the liquid crystal molecules having the lower pretilt angle acts as an optical retarder having a greater retardation, preferably double, that of the optical retarder defined by the liquid crystal molecules having the higher pretilt angle. Whilst the best results are obtainable with pretilt angles in the first and second regions which produce, in use, an effective optical retardation ratio of 2.0, it is considered that acceptable results can be achieved if such ratio is from 1.8 to 2.2. The alignment direction of the alignment layer producing the lower pretilt angle is preferably disposed at an angle of about 15°±about 15° relative to the polarisation or absorption axis of said first linear polariser.

The device may include one or more passive (or fixed) optical retarders, and/or more than one chromatic twisted surface mode device according to the invention may be used in series to improve chromaticity further and, it is believed, viewing angle and operating voltage. The or one of the passive optical retarders may be defined by the above-mentioned transparent divider.

In embodiments where a reflective mode device includes a passive optical retarder, the optic axes of the three optical retarders (i.e. the two active and the passive retarders) may be disposed, with respect to the polarisation or absorption axis of the first linear polariser, at angles a, b and c such that angle a is in the range of 2 to 25° inclusive; angle b is (x.a)°, where x is in the range of from 1 to 10, inclusive; and angle c is (2(b−a)+45)°. Preferably, angle a is 6.9° and x=5.

It is also within the scope of the present invention to provide a further passive optical retarder, said further passive optical retarder being of the negative birefringent type, i.e. one having its optic axis perpendicular to the plane of the retarder. Such a retarder can partially compensate the out-of-plane component of the switched active liquid crystal cell, and thereby enable an improved viewing angle to be achieved.

The device of the present invention is considered generally more suitable for active matrix driving than for passive matrix driving if grey scale is required. The active matrix may be of the thin film transistor (TFT) or of the metal-insulator-metal (MIM) type. In a reflective mode device, the TFT or MIM elements are preferably disposed on the opposite side of the reflector to the LCD cell so as to maximise the aperture ratio of the device.

The liquid crystal layer may be constituted by nematic liquid crystal molecules or a chiral dopant may be incorporated in the liquid crystal layer in order to stabilise one twist state over the other in the twisted structure. Any liquid crystal material having a positive dielectric anisotropy may be employed. Materials having a higher birefringence are preferred to enable lower cell thicknesses to be employed. The material may be a non-TFT (thin-film-transistor) type material, of which BL037 (Merck Ltd) is a good example, or it may be a TFT-type material, of which TL213 (Merck Ltd) is a good example.

The present invention also resides in a liquid crystal device comprising first and second liquid crystal layers, and means for applying a variable voltage across each of the liquid crystal layers, the first and second liquid crystal layers being of electrically controllable birefringence and arranged so as to act, in use, like respective first and second active optical retarders having mutually inclined optic axes and whose retardations which can be varied within a range to cause colour.

Each of the first and second liquid crystal layers may be defined by a respective liquid crystal cell independently selected from a pi-cell, a Freedericksz-cell, a HAN-cell and a TN cell.

Some of the above described features and arrangements are defined in the appended claims which also define other features and arrangements.

Further details of the advantages of the present invention will become apparent from the following description in relation to the accompanying drawings, in which.

The drawings of the various devices do not show the various layers of the device to scale but have been produced to demonstrate more clearly the features of the present invention and the advantages thereof over single optic axis colour birefringent devices.

Figure 1:
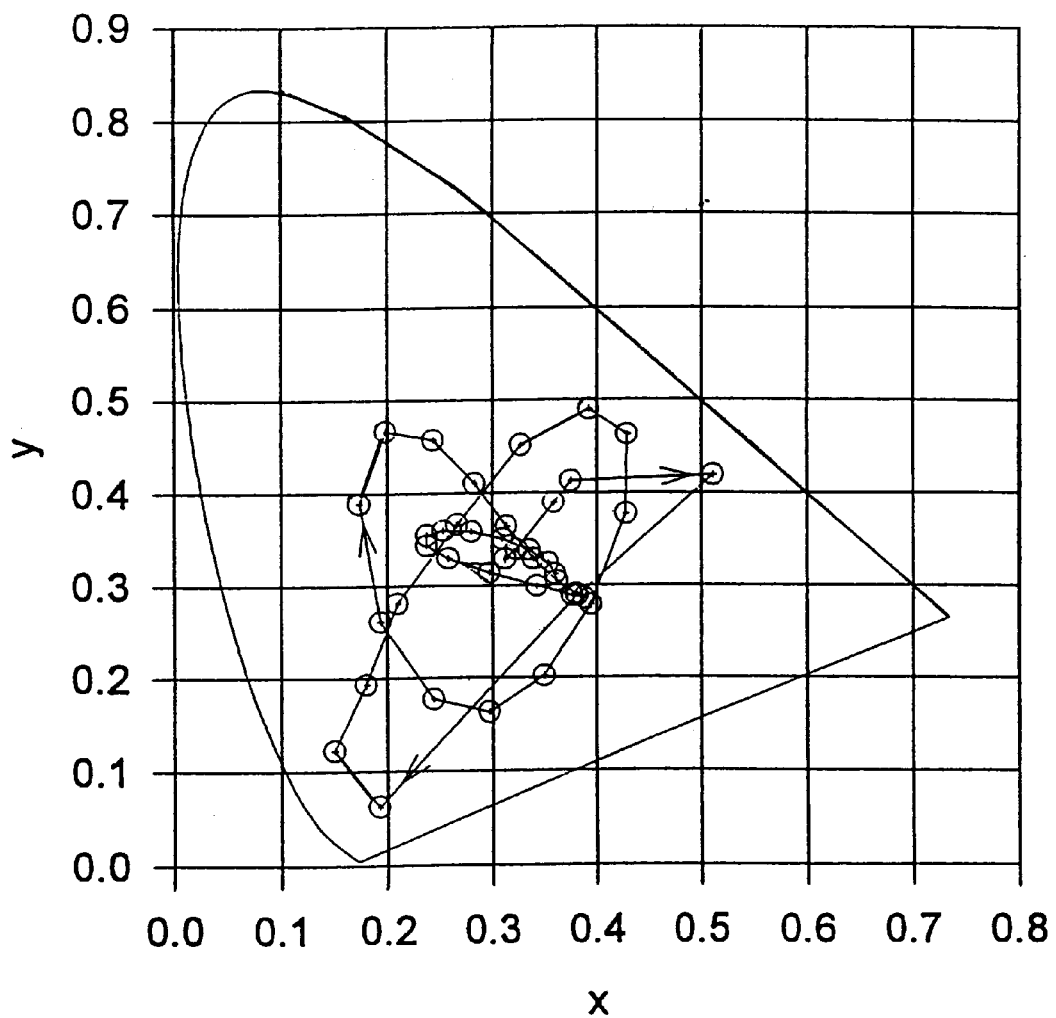
FIG. 1 shows the calculated gamut (plotted on CIE 1931 using light source D65) of a conventional type of single optic axis colour birefringent E7 type optical retarder between mutually parallel polarisers for retardations of 0–1900 nm, the arrows showing the direction of increasing retardation.

As shown in FIG. 1, the chromaticity gamut (accessible hue and saturation in colour space) that may be obtained with a conventional single uniaxial birefringent element of variable optical retardation is limited. Whilst the subtractive primary colours (cyan, magenta and yellow) are reasonably accessible, it will be noted from FIG. 1 that it is not possible in particular to obtain a saturated red hue.

Figure 2:
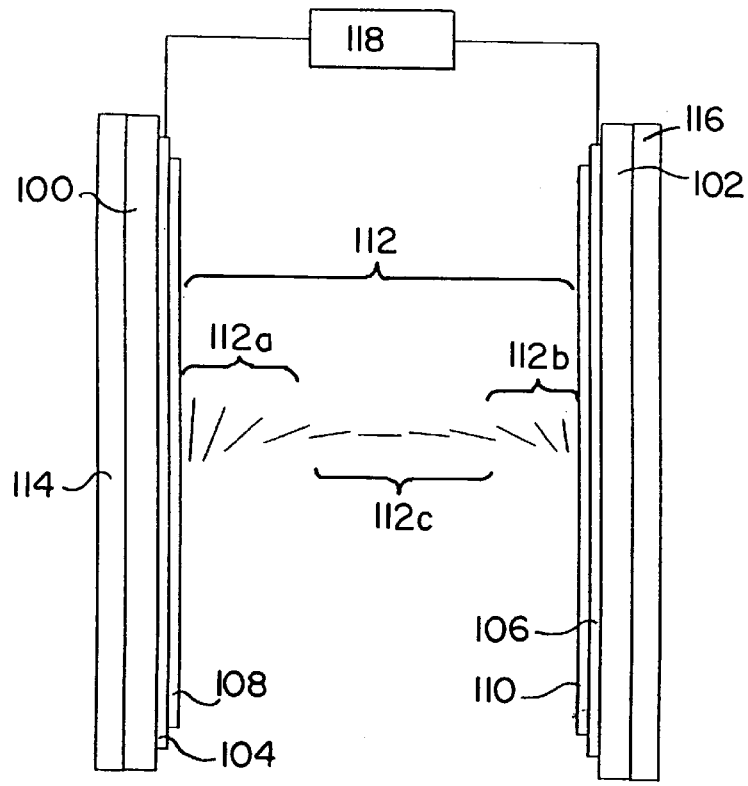
FIG. 2 is a schematic side view showing operation of an enhanced chromaticity surface switching mode liquid crystal device according to the present invention, designed for operation in transmissive mode.
Figure 3:
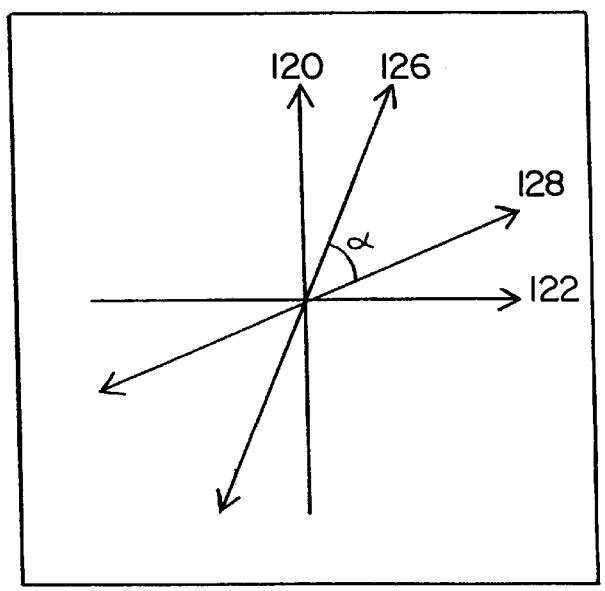
FIG. 3 is an end view of the device of FIG. 2 showing the alignment directions of alignment layers in the device of FIG. 2 in relation to the polarisation direction of linear polarisers also forming part of the device of FIG. 2, and further showing alternative possible alignment directions.

Referring now to FIGS. 2 and 3 of the drawings, the liquid crystal device illustrated therein comprises a cell defined by first and second mutually parallel glass plates 100 and 102, respectively, having electrodes 104 and 106 formed on their mutually facing surfaces. Respective alignment layers 108 and 110 are provided over the electrodes 104 and 106, and a liquid crystal layer 112 fills the gap between the alignment layers 108 and 110. First and second linear polarisers 114 and 116 are provided on opposite sides of the cell. The polarisation axes 120 and 122 may be mutually perpendicularly disposed as illustrated in FIG. 3, or may be mutually parallel, depending upon the chosen type of operation of the device. The alignment layers 108 and 110 are rubbed or otherwise aligned so that their respective alignment directions 126 and 128 (FIG. 3) are mutually inclined at an angle $\alpha$. In this embodiment, the angle $\alpha$ is 45°, and the alignment direction 126 of alignment layer 108 is disposed at an angle which is 22.5° relative to the polarisation or absorption axis 120 of polariser 114. Light is transmitted across the device from left to right as viewed in FIG. 2 so that the second polariser 116 constitutes an analyser. However, alternative alignment directions are shown in the bottom left hand quadrant of FIG. 3 so that there may be either a 45° or a 135° twist to the liquid crystal molecules across the liquid crystal layer 112 at zero field.

A variable voltage driver 118 is provided to enable a voltage to be applied via the electrodes 104 and 106 across the liquid crystal layer 112. The electrodes 104 and 106 may be arranged to apply the voltage across any one or more parts of the layer 112 or over the whole of such layer 112 depending upon the intended use of the device.

In use, the device of FIGS. 2 and 3 is driven by driver 118 via the electrodes 104 and 106 over a voltage range in which it operates in a surface switching mode whereby first and second regions 112a and 112b of the liquid crystal layer 112 near to the alignment layers 114 and 116 are not only effectively optically de-coupled (i.e. the maximum liquid crystal director tilt angle in an intermediate region 112c of the liquid crystal layer 112 is >70° and preferably approaches 90° i.e. are effectively homeotropic), but are also mutually inclined. These first and second regions 112a and 112b therefore effectively act like. two separate, active (i.e. variable or tunable) uniaxial optical retarders having mutually inclined optic axes.

At one particular (high) voltage level, a zero optical retardation condition occurs in the layer 112. When the polarisation axes 120 and 122 are mutually perpendicularly disposed, this produces extinction of light through the device. However, when the polarisation axes 120 and 122 are mutually parallel, maximum light transmission takes place.

At another (lower) voltage, these active optical retarders will act like a net half-wave optical retarder for a particular wavelength of light. Changing the voltage level varies the wavelength at which half wave optical retardation takes place. It is to be appreciated that the first and second regions 112a and 112b do not act precisely as uniaxial optical retarders which are totally optically decoupled. This would require all the liquid crystal directors in the first region 112a to be mutually aligned, all the liquid crystal directors in the second region 112b to be mutually aligned, and the liquid crystal directors in the intermediate region 112c to be homeotropic. Such a condition is not practically achievable but can be approached to a sufficient extent to enable the beneficial effects of two uniaxial optical retarders with optic axes, aligned with the alignment directions 126 and 128, respectively, to be achieved. Thus, the first and second regions 112a and 112b are described herein as acting, in use, like first and second active optical retarders having mutually inclined optic axes. When the first and second regions act like a net half-wave optical retarder for light of a particular wavelength in a device with mutually perpendicular polarisers 114 and 116, maximum transmission of such light through the device takes place. On the other hand, when the polarisers 114 and 116 are mutually parallel, transmission of such light is minimised.

In a range of lower voltage levels, the active optical retarders operate in tuneable colour birefringent mode so that the colour of the display can be varied by variation of the voltage within this range.

EXAMPLE 1

Figure 4:
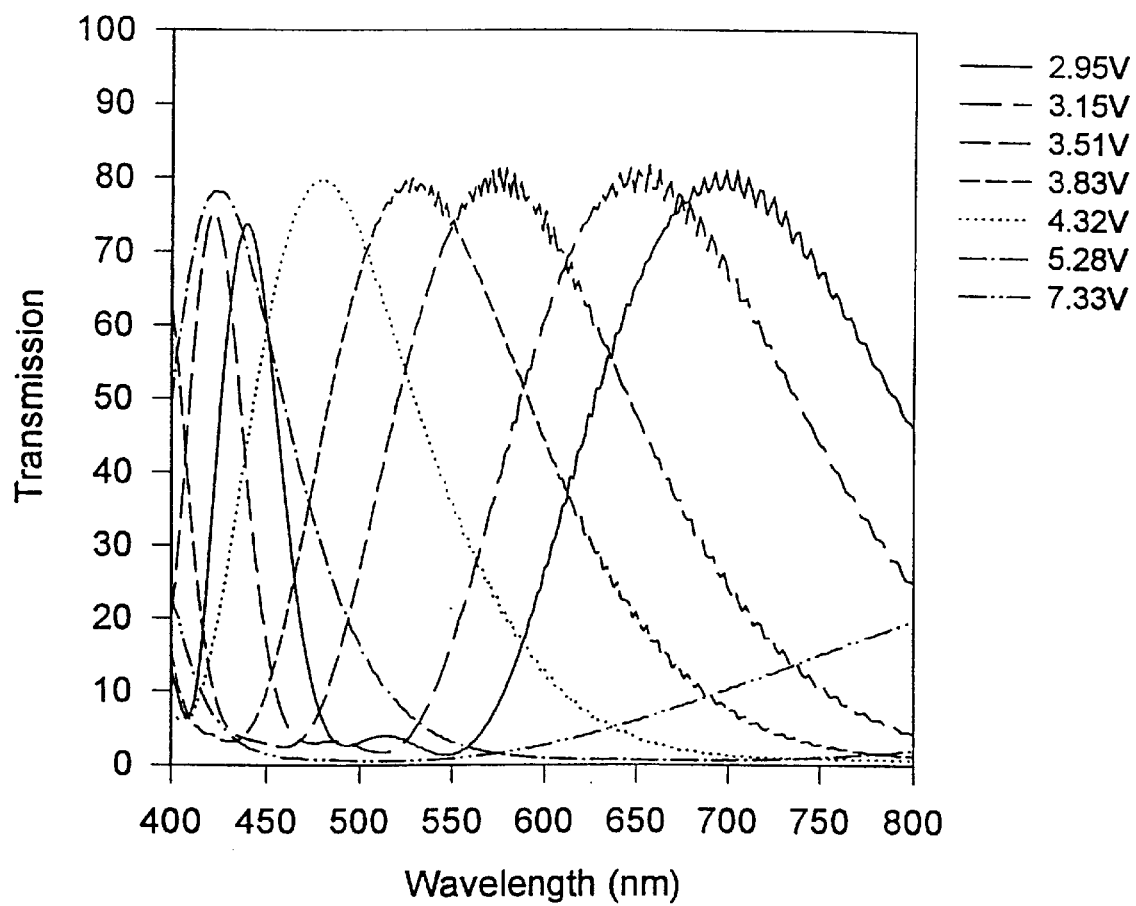
FIG. 4 is a graph plotting transmission with wavelength for the device of FIG. 2 but with mutually parallel linear polarisers, showing how the spectrally narrowed transmission peak (as compared with a single optic axis colour birefringent device) can be tuned through the visible spectrum.
Figure 5:
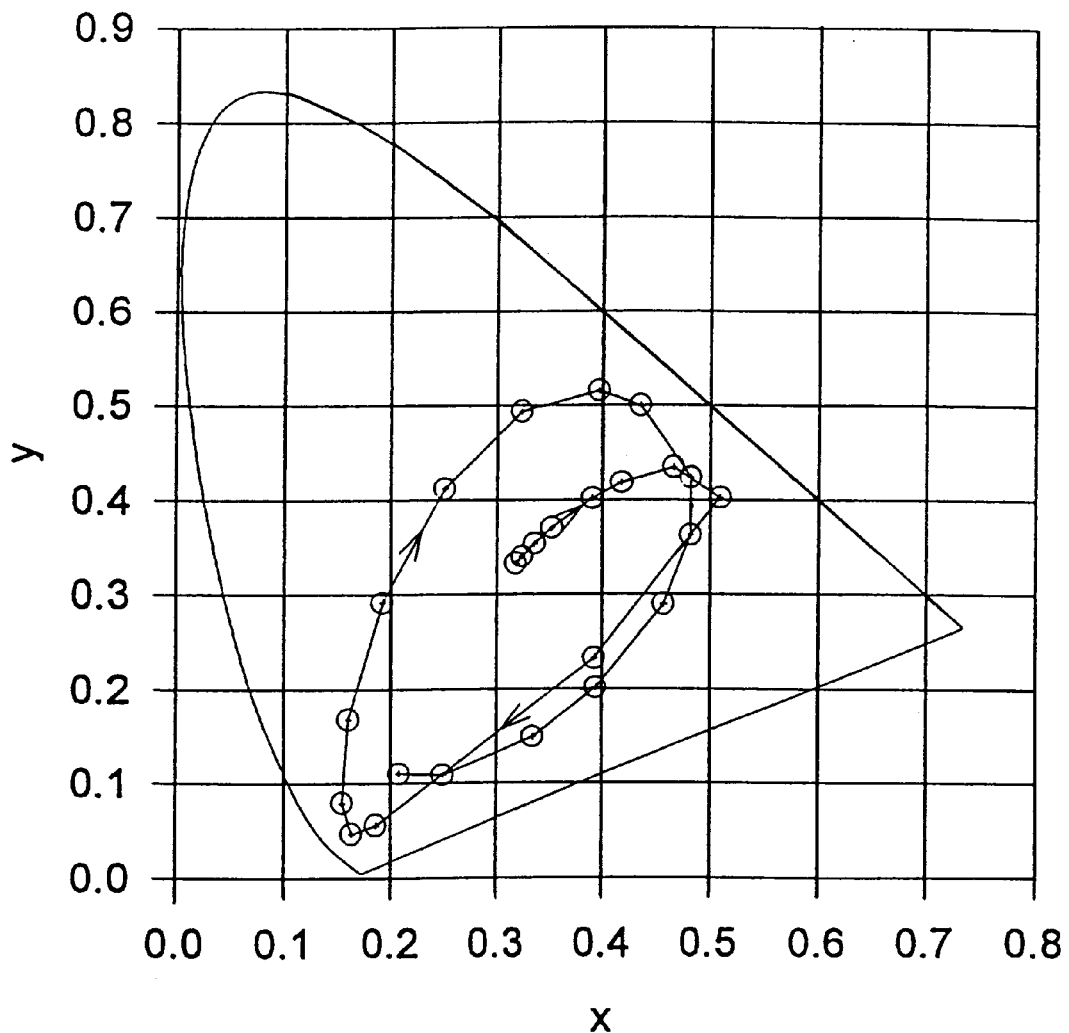
FIG. 5 shows the measured CIE values (1931, source D65) for the curves of FIG. 4 and other data not plotted on FIG. 4.

An LCD of the general type described above with reference to FIGS. 2 and 3 was prepared with the alignment layers 108 and 110 formed of polyimide producing, in the zero voltage state, about 5° pretilt angle to the directors of the liquid crystal molecules in each region 112a, 112b. Such polyimide alignment layers 108 and 110 were rubbed at 135° to each other (i.e. at angle $\alpha=45°$ and in a substantially anti-parallel direction). The cell gap (i.e. the spacing between the alignment layers 108 and 110) was set at 25 $\mu$m, and the cell was filled with liquid crystal material BL037 (Merck Ltd). Such liquid crystal was undoped (i.e. d/p=0) which gives a better twist profile for optical decoupling of the first and second regions at a finite voltage. After filling, the LCD had a 45° twist angle with the liquid crystal director in an unsplayed configuration (i.e the director had a uniform tilt profile across the layer; in a splayed profile, the tilt varies across the thickness of the layer). FIG. 4 shows the transmission of this device between mutually parallel linear polarisers at various voltages (and hence optical retardations). The corresponding gamut range plotted on the 1931 CIE diagram is shown in FIG. 5 where it can be seen that, as compared to the gamut shown in FIG. 1, the hue and saturation obtainable from this device are superior to a single uniaxial element. In particular, the device is capable of producing a more saturated red hue. The following Table gives the voltages at which the best additive and subtractive primaries were observed.

| Hue     | Voltage | L*   | a*   | b*   |
|---------|---------|------|------|------|
| Magenta | 2.95    | 41.9 | 384  | -218 |
| Red     | 3.15    | 60.3 | 281  | 43   |
| Yellow  | 3.51    | 83.3 | -57  | 401  |
| Green   | 3.83    | 82.4 | -230 | 236  |
| Cyan    | 4.32    | 65.9 | -189 | -115 |
| Blue    | 5.28    | 29.2 | 245  | -387 |
| Black   | 7.33    | 7.5  | 121  | -31  |

In the above table, L* is the Lightness and a* and b* are the colour co-ordinates which specify the hue and saturation of the 'colour' according to a recognised CIE colour system.

Very similar results may be obtained using an initial (i.e. zero field) twist of 45° in a splayed configuration, or a 135° twist state with either a splayed (requiring some chiral dopant) or unsplayed director profile.

EXAMPLE 2

Figure 6:
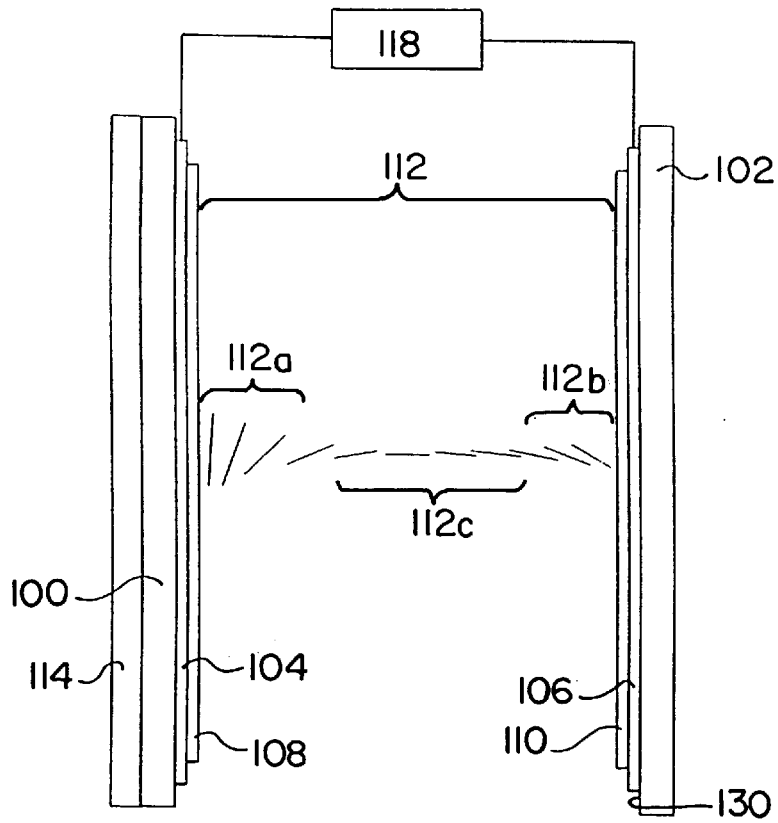
FIG. 6 is a schematic cross-section through another embodiment of device according to the present invention, designed to be operated in reflective mode.
Figure 7:
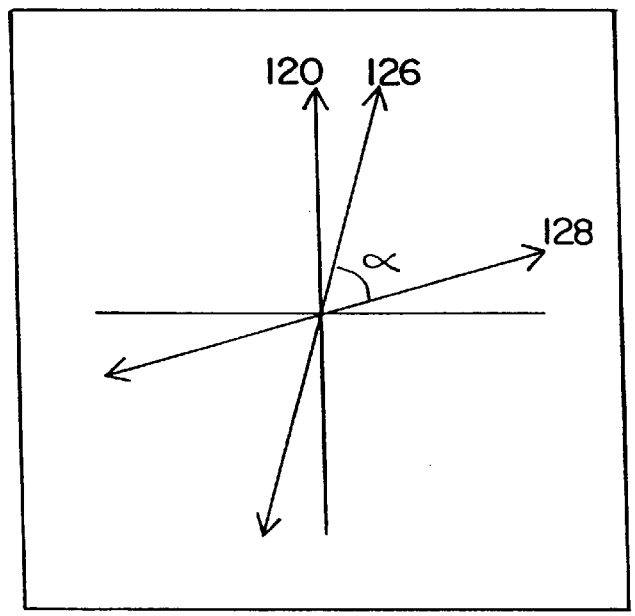
FIG. 7 is a schematic end view of the device of FIG. 6 showing the alignment directions of alignment layers in the device of FIG. 6 in relation to the polarisation direction of linear polarisers also forming part of the device of FIG. 6, and further showing alternative possible alignment directions.

It is possible to use the device in reflective mode, such a device is shown in FIGS. 6 and 7 where similar parts to the device of FIGS. 2 and 3 are accorded the same reference numerals. In this embodiment, however, the second linear polariser 116 is replaced by a polarisation-preserving reflector 130 provided on the glass plate 102. It is however within the scope of the present invention to retain the second linear polariser 116 and provide the reflector behind the second linear polariser 116. The second electrode 106 may be formed to provide the reflector.

In this embodiment, the optical retardations of the first and second regions 112a and 112b are in the ratio of about 2:1, respectively. In this embodiment, the alignment direction 126 is at 15° to the polarisation axis 120 of polariser 114, and alignment direction 128 is at an angle of 60° to the alignment direction 126 and 75° to the polarisation axis 120 of polariser 114. In an alternative embodiment, the alignment directions 126 and 128 are at 120° relative to each other. The reflectivity versus wavelength for such device is calculated to be almost identical to the device of Example 1.

An LCD of the general type described above in relation to FIGS. 6 and 7 was prepared wherein the alignment surfaces 108 and 110 give different pretilt angles. These were produced first by use of a polyimide layer rubbed to give a pretilt angle of about 2°. The structure intended to produce the second alignment layer 110 was then overcoated with a liquid crystal gel layer in accordance with the teachings of EP-A-0467456 whose disclosure is incorporated herein by reference. The thickness of such gel layer can be controlled so as to yield the desired pretilt angle at the ultimate interface with the liquid crystal layer 112. Measurement of the pretilt angle in a separate cell gave a value of around 350.

Figure 8:
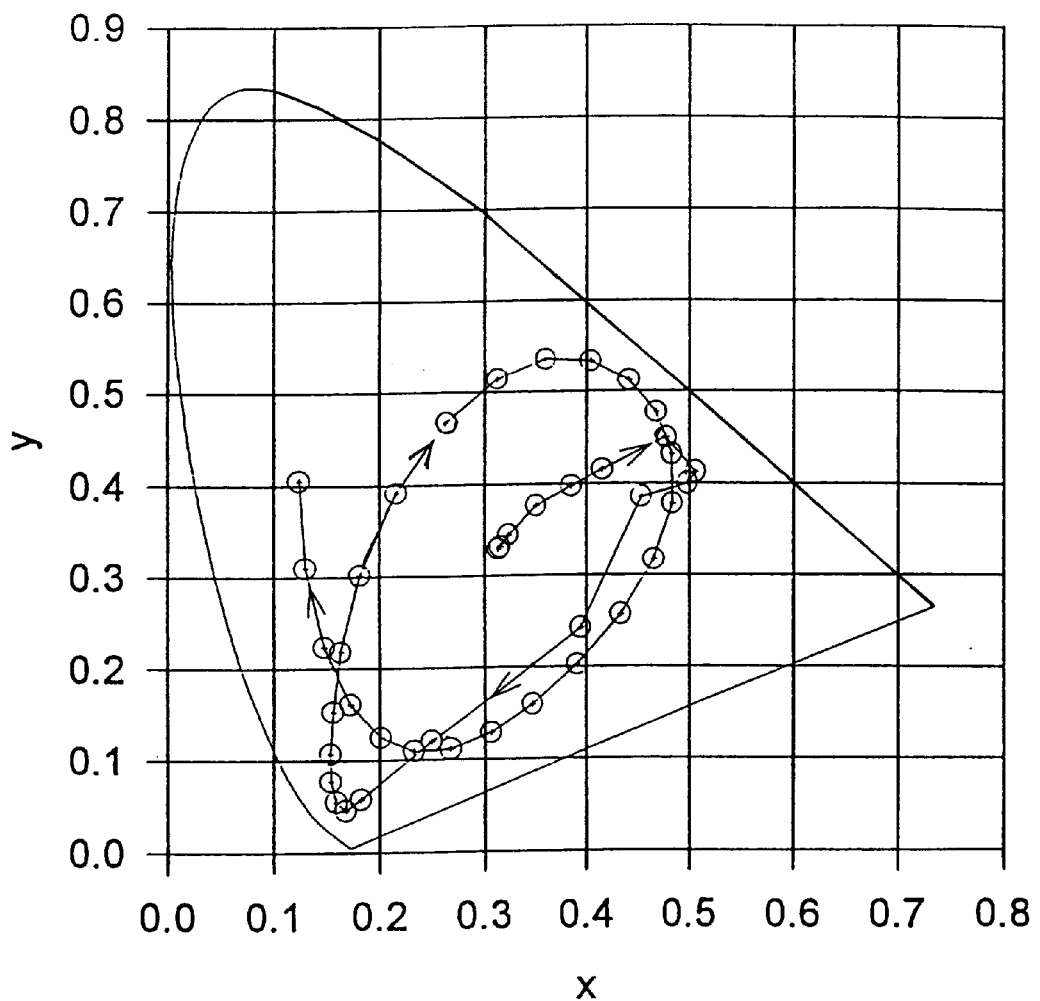
FIG. 8 shows calculated CIE values (1931, D65) for the device of FIGS. 6 and 7 assuming that an E7 type material is used and that the first region of the liquid crystal layer can exhibit an optical retardation range of 0–932 nm.

In principle, any alignment technique which gives a suitable pretilt angle may be used. A 25 μm cell was fabricated with 60° between the alignment directions 126 and 128 and filled with BL037 liquid crystal material (Merck Ltd). The calculated CIE values for the reflectivity which is to be expected from such a device is shown in FIG. 8.

EXAMPLE 3

Figure 9:
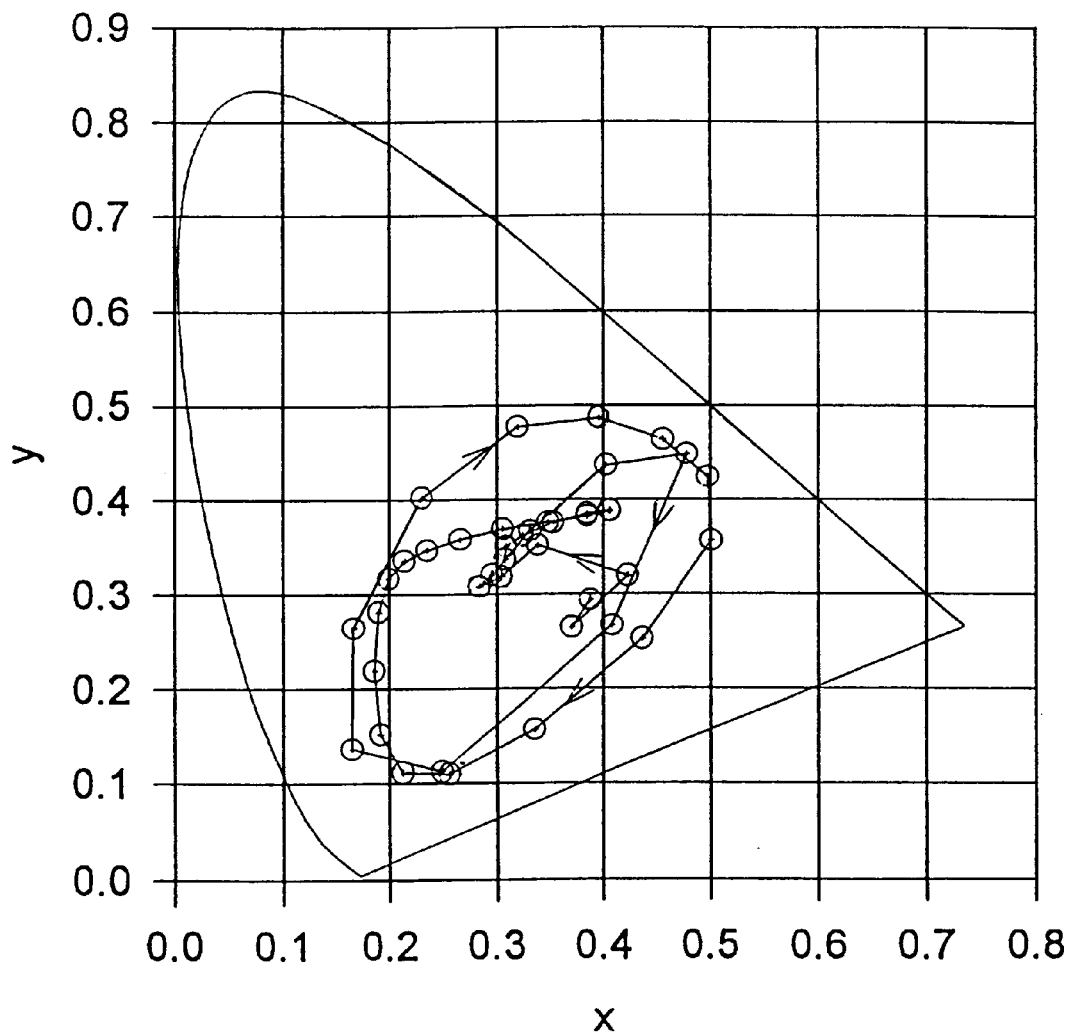
FIG. 9 shows calculated CIE values (1931, D65) for the device of Example 3 below assuming E7 type materials and a retardation range of 0–932 nm.

In this Example, the device of Example 2 is used with one or more additional passive (or fixed) optical retarders to improve the chromaticity for certain optical retardations of the active optical retarders. One possibility is to use a passive optical retarder of retardation 500 nm with its optic axis at 45° to the polarisation axis 120 of polariser 114. The liquid crystal material 112 described in Example 1 above can then be disposed between the polariser 114 and this passive retarder with the alignment direction 126 of the first alignment surface 108 being at 22.5° to the polarisation axis 120, and the alignment direction 128 of the second alignment surface 110 being at -22.5° to the polarisation axis 120. The calculated CIE coordinates for such a device in reflection are shown in FIG. 9. As can be seen, the calculated chromaticity gamut is better than that of FIG. 1.

Other arrangements are possible in which a passive retarder is located between the polariser 114 and the liquid crystal layer 112 which could then be of the type described in Example 2 above. Alternatively, more than one passive optical retarder may be used either in front of or behind the liquid crystal layer 112 relative to the polariser 114 with its axis at 6.9° to the polariser 114. In this case, the liquid crystal layer 112 of the type described in Example 2 above but with a 65.8° or 114.2° twist may be employed with the alignment directions 126 and 128 being at angles a and b which are equal to 34.5° and 100.2°, respectively, relative to the polarisation axis 120 of the linear polariser 114.

EXAMPLE 4

The devices of Examples 1 and 2 may also be combined with additional switchable elements of a nematic type or may be combined with each other to improve chromatic behaviour. Whilst only nematic devices are considered in this Example, it is considered possible to achieve a similar result using at least one nematic device of the invention with one or more smectic devices.

Figure 10:
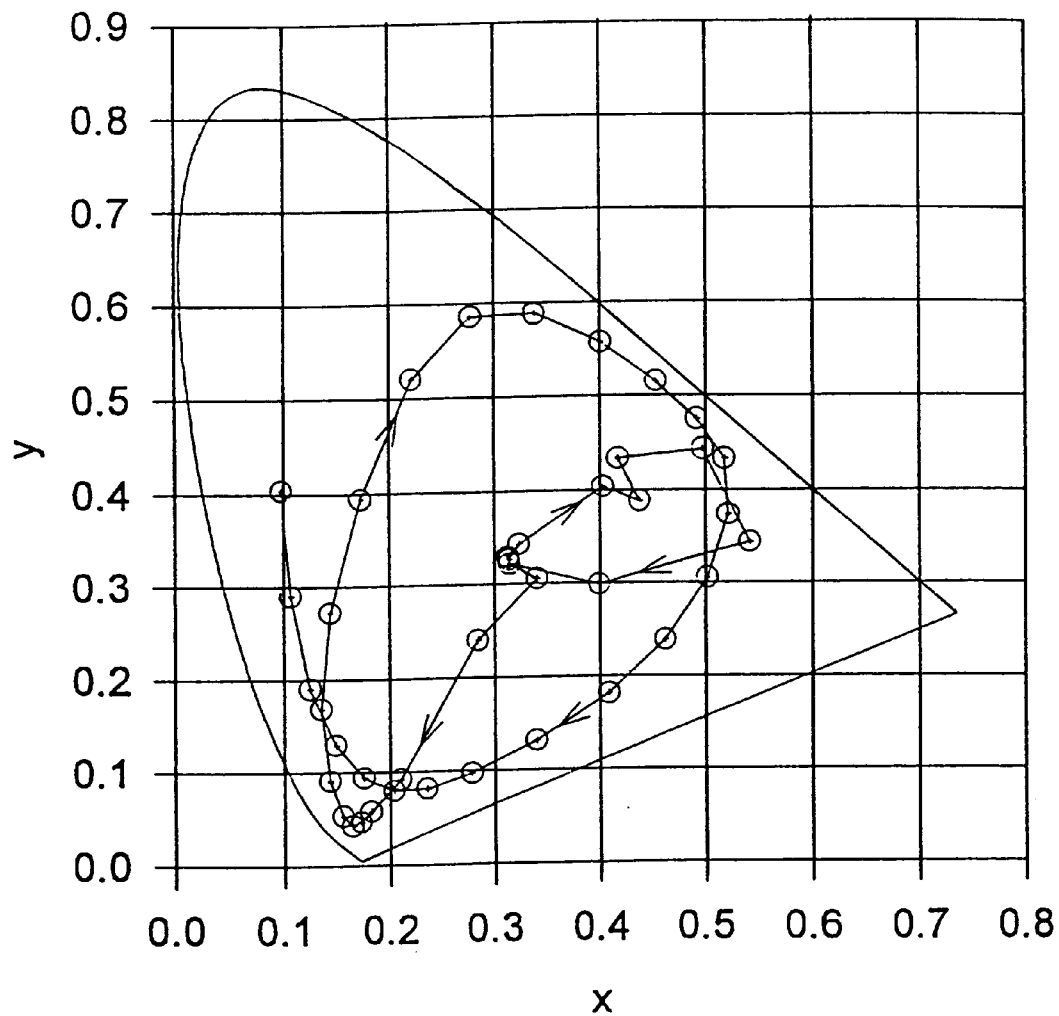
FIG. 10 shows calculated CIE values (1931, D65) for the first device of Example 4 below assuming E7 type materials and a retardation range of 0–932 nm.

In one possible embodiment, the device of Example 1 is used in a reflective mode display, but with a twist angle of either 27.6° or 152.4° In this case, the alignment direction 126 would be at an angle of 6.9° to the polarisation axis 120 and hence the alignment direction 128 would be at an angle of 34.5° relative to the polarisation axis 120. A second active switching device (e.g. a pi cell) could form a third active optical retarder with its optic axis at 100.2° relative to the polarisation axis. This is considered to lead to a thinner second device as it only needs to provide a retardation which is one half of the effective retardation of each region 112a, 112b. In this case, the optical retardations of each region 112a and 112b in the device of the present invention and the second active switching device is kept in the exact ratio of 2:1. Using a second active layer instead of a passive optical retarder (as in Example 3 above) has the advantage of being able to maintain a constant optical retardation ratio at all retardation values. This is considered to enable a further improvement to be achieved in the chromaticity gamut. FIG. 10 shows the calculated CIE values for the reflectivity of such a device. As can be seen, the calculated gamut has been significantly widened over that of the device alone (cf. FIG. 8).

It is considered that the gamut can be improved still further by using two devices according to the present invention in series. One possible configuration would be to combine the devices of Examples 1 and 2 in series between a polariser and a reflector with the following alignment directions, which are given purely by way of example:

| Alignment direction | Angle relative to axis 120 |
|---|---|
| axis 126 | 6.5° |
| axis 128 | 25.7° |
| 126 (Example 2) | 64.3° |
| 128 (Example 2) | 135° |

Figure 11:
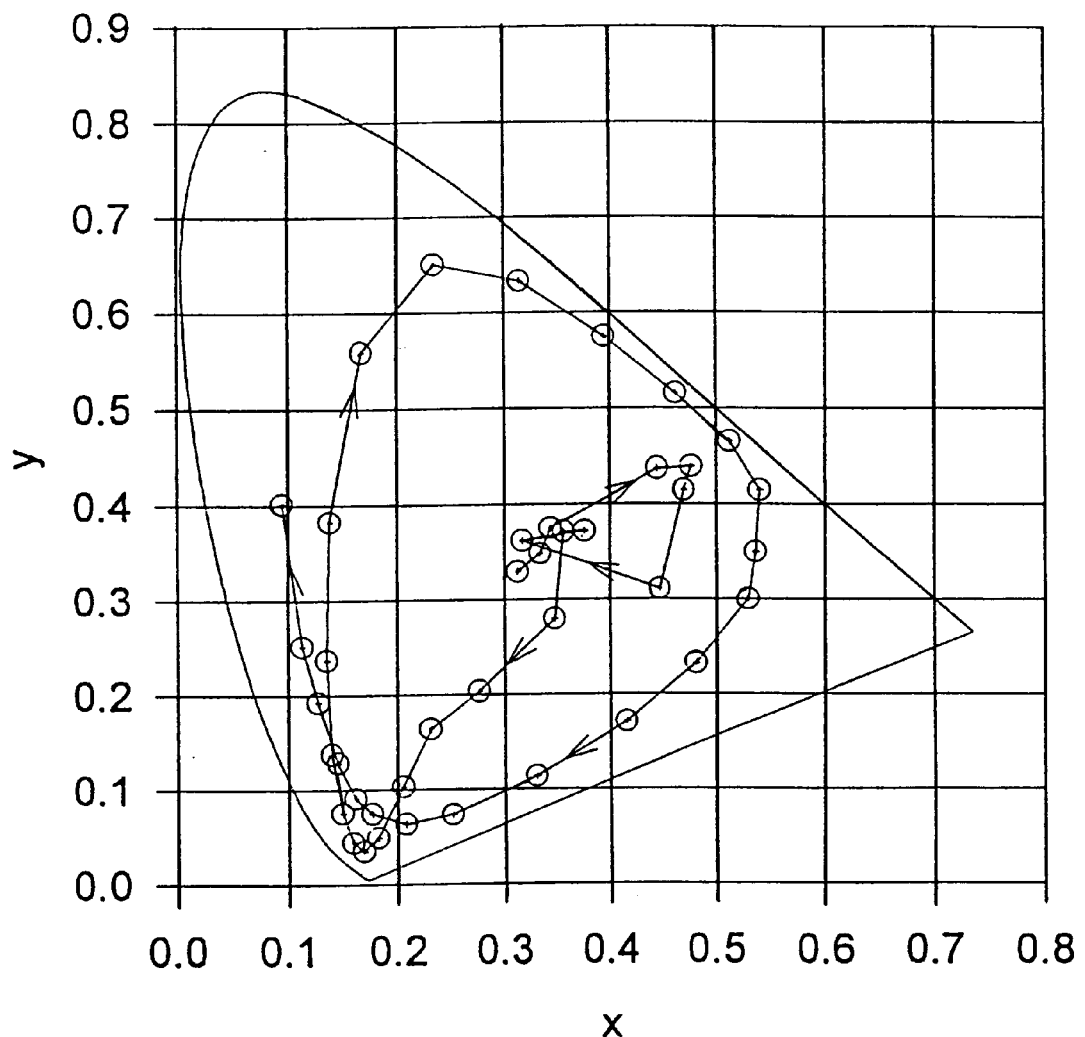
FIG. 11 shows calculated CIE values (1931, D65) for the second device of Example 4 below assuming E7 type materials and a retardation range of 0–932 nm.

The calculated chromaticity gamut which can be obtained from such a device is illustrated in FIG. 11. The calculated gamut of such a device is considerably improved over the previous Examples, thus enabling a device with very saturated colours.

EXAMPLE 5

Figure 12:
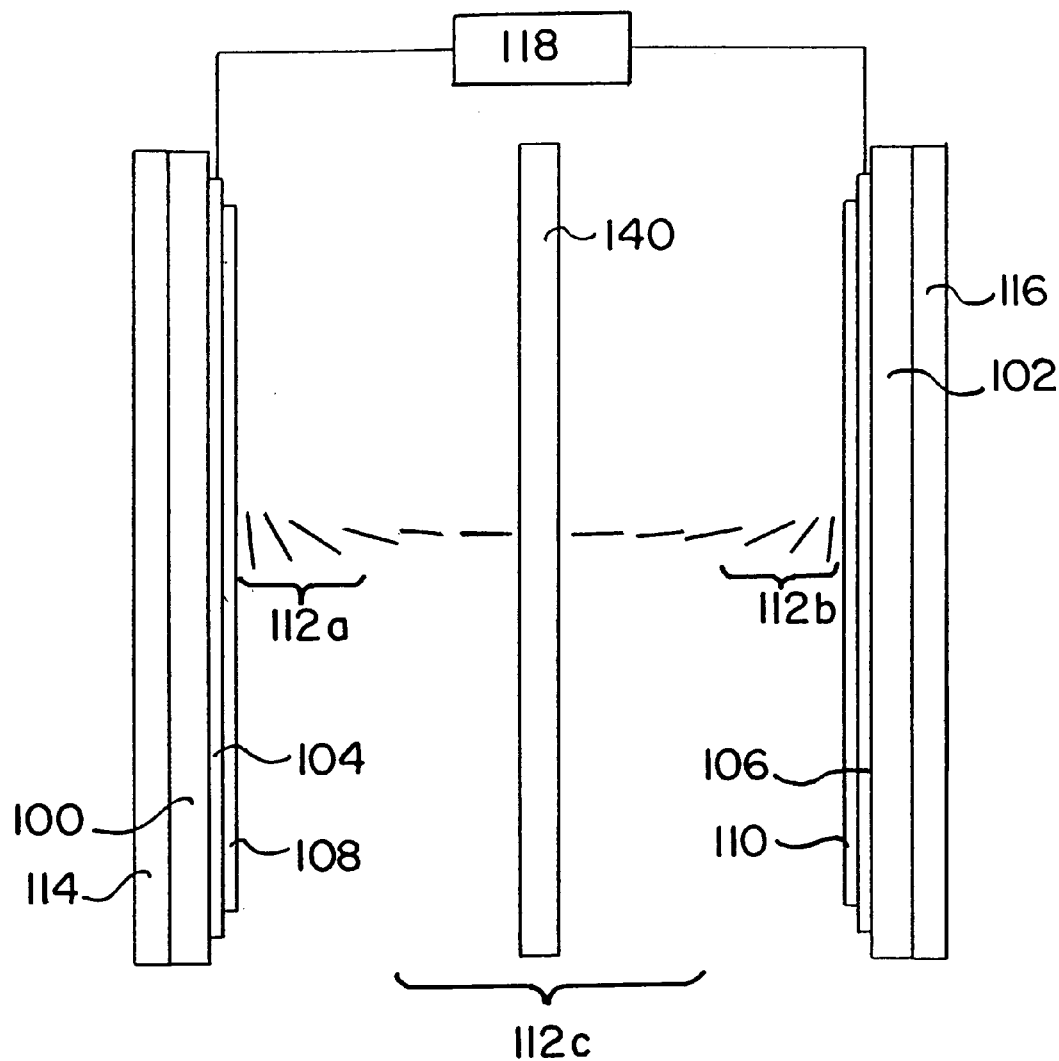
FIG. 12 is a schematic cross-section of a still further embodiment of device according to the present invention, wherein a transparent divider is used to achieve effective de-coupling of surface switching regions of the liquid crystal layer, as opposed to use of a high field.

Referring now to FIG. 12, similar parts to those of the previously described devices are accorded the same reference numerals. In this embodiment, a liquid crystal cell is provided which is separated into two parts, in this embodiment, by a divider in the form of a thin membrane 140. In this particular example, such membrane provides a homeotropic alignment of the directors of the liquid crystal molecules in the central region 112c of the layer 112 so as to give completely decoupled first and second regions 112a and 112b. The alignment layers 108 and 110 induce alignment in appropriate directions, and different pretilt angles may be employed depending on the mode of operation required. Any of the arrangements and mode of operations described hereinabove may be employed. This Example has the advantage of being able to achieve layer optical retardations in the first and second regions that are greater than in the previous Examples as the centre of the cell is homeotropic for all applied voltages. The membrane 140 may act as a passive optical retarder.

Figure 13:
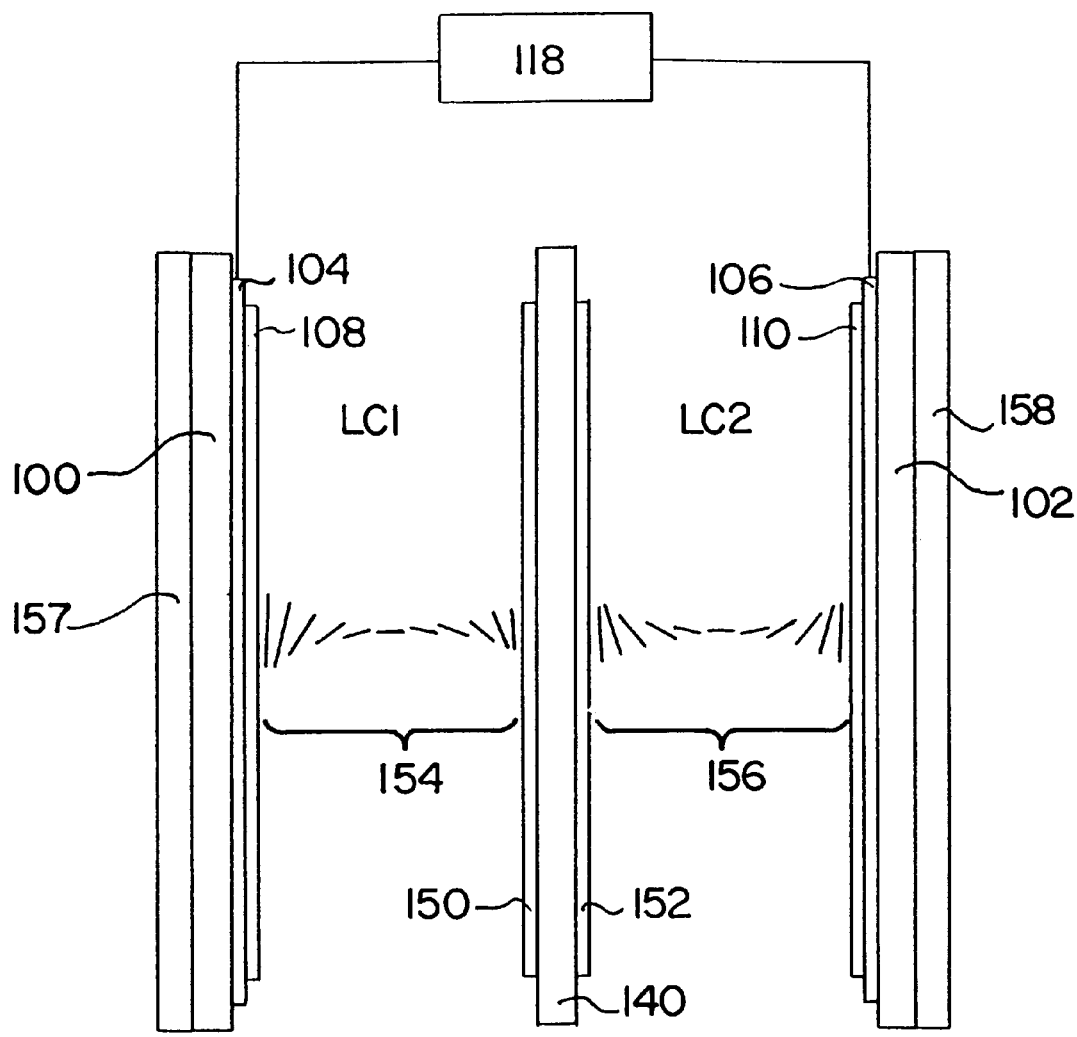
FIG. 13 is a schematic cross-section of a further liquid crystal device in which two planar, aligned liquid crystal cells separated by a divider are driven by a common driver.

Referring now to FIG. 13, the device is similar to that of FIG. 12 in that membrane 140 is provided, and similar parts are similarly numbered. In this embodiment, however, alignment layers 150 and 152 at opposite surfaces of the membrane 140 are such as to produce a non-homeotropic alignment of the adjacent liquid crystal directors. First and second liquid crystal cells LC1 and LC2 of electrically controllable birefringence (ECB) type having respective liquid crystal layers 154 and 156 are provided on opposite sides of the membrane 140. The alignment layers 108 and 150 of the first cell LC1 and the alignment layers 152 and 110 of the second cell LC2 are rubbed or otherwise aligned so that the alignment directions in the liquid crystal layers 154 and 156 are different. In use, the first and second liquid crystal layers 154 and 156 are arranged so as to act like respective first and second active optical retarders having mutually inclined optic axes, in a similar manner to the liquid crystal regions 112a and 112b of the previously described layer 112. Each cell LC1 and LC2 may be of any desired electrically controlled birefringence (ECB) type, eg a Pi cell, a Freedericksz cell a HAN cell or a twisted nematic cell.

Any of the arrangements and mode of operations described hereinabove can be adopted for the embodiment of FIG. 13. Like that of FIG. 12, the membrane 140 of FIG. 13 may define a passive optical retarder.

Alternatively, either or both of the cells of FIG. 13 may be of the type described above with reference to FIG. 2 or 6. In which case, the or each such cell has its own first and second regions 112a and 112b separated by region 112c, as described previously.

Figure 14:
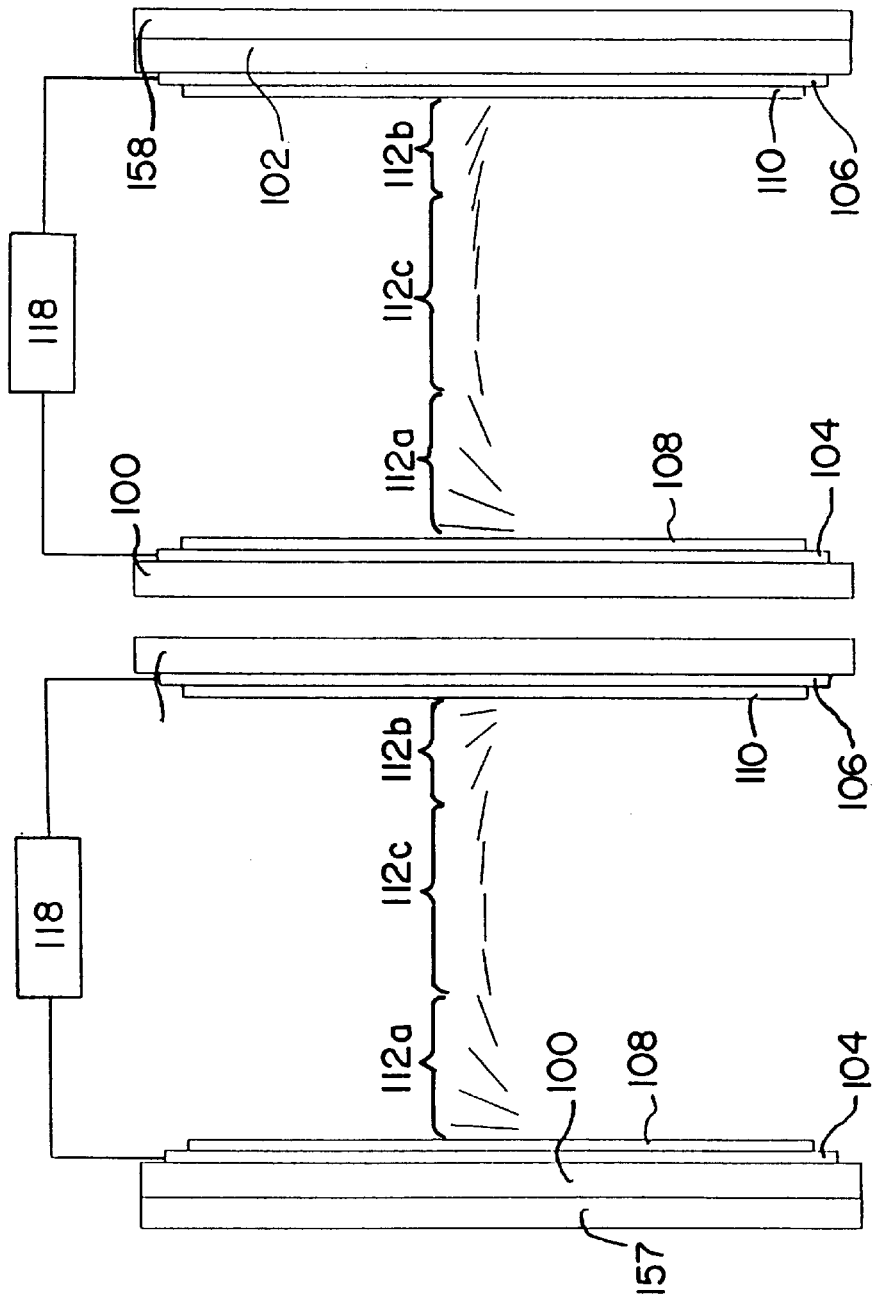
FIG. 14 is a schematic cross-section of a still further liquid crystal device in which two planar, aligned liquid crystal cells are independently driven.

In FIG. 14, a similar arrangement to this is shown wherein the membrane 140 is omitted and each separate aligned cell is independently driven by a respective driver 118 instead of being commonly driven.

Elements 157 and 158 shown in FIGS. 13 and 14 constitute first and second linear polarisers, respectively, if the device is to be used in transmissive mode. Alternatively, the elements 157 and 158 constitute a linear polariser and a reflector, respectively, if the device is to be used in reflective mode.

What is claimed is:

1. A twisted liquid crystal device comprising:
    a liquid crystal layer;
    first and second alignment layers disposed on opposite sides of the liquid crystal layer, the first and second alignment layers having respective alignment directions in a plane parallel to the first and second alignment layers which are mutually inclined;
    a first linear polarizer disposed on the opposite side of the first alignment layer to the liquid crystal layer; and
    means for applying a variable voltage across the liquid crystal layer,
    wherein the liquid crystal layer has a twisted nematic liquid crystal structure and is arranged for operation in a surface switching mode with first and second regions of the liquid crystal layer adjacent the first and second alignment layers acting, when in use, like a pair of active optically decoupled retarders having mutually inclined optic axes and retardations which can be varied within a range to cause color.

2. A device as claimed in claim 1, wherein a driver means is provided which, when in use, applies a voltage across the liquid crystal layer such that liquid crystal molecules in an intermediate region of the liquid crystal layer are at a tilt angle of greater than 70° relative to the first and second alignment layer.

3. A device as claimed in claim 1, wherein liquid crystal molecules in the first and second regions have substantially equal pretilt angles.

4. A device as claimed in claim 3, for operation in a transmissive mode, wherein a second linear polarizer is disposed on the opposite side of the second alignment layer to the liquid crystal layer and has a polarization axis disposed at an angle relative to the alignment direction of the second alignment layer, and
    wherein the device is operated when in use at least in a voltage range in which the active optical retarders exhibit color.

5. A device as claimed in claim 4, wherein the alignment direction of the second alignment layer is at an angle of substantially 3β relative to a polarization or absorption axis of the first linear polarizer, where β is an angle between the polarization or absorption axis of the first linear polarizer and the alignment direction of the first alignment layer.

6. A device as claimed in claim 3, wherein the alignment direction of the first alignment layer and the second alignment layer are mutually inclined at an angle of 45°±about 12.5° or 135°±about 12.5°.

7. A device as claimed in claim 3, wherein the alignment direction of one of the first and second alignment layers is disposed at an angle of about 22.5° relative to the polarization or absorption axis of the first linear polarizer.

8. A device as claimed in claim 1, wherein liquid crystal molecules in the first and second regions have unequal pretilt angles whereby, when in use, the first and second regions act like optical retarders having different optical retardations.

9. A device as claimed in claim 8, wherein the device is operated when in use at least in a voltage range in which the active optical retarders exhibit color.

10. A device as claimed in claim 8, for use in a reflective mode, wherein a reflector is disposed on the opposite side of the second alignment layer to the liquid crystal layer.

11. A device as claimed in claim 10, wherein the alignment direction of the second alignment layer is at an angle of substantially $(2\beta+45°)$ relative to a polarization or absorption axis of the first linear polarizer, where $\beta$ is an angle between the polarization or absorption axis of the first linear polarizer and the alignment direction of the first alignment layer.

12. A device as claimed in claim 10, further comprising at least one passive optical retarder having its optic axis inclined with respect to the alignment directions of the first and second alignment layers,
    wherein the optic axes of the optical retarders are disposed, with respect to the polarization or absorption axis of the first linear polarizer, at angles a, b and c, where angle a is in the range of 2 to 25° inclusive; angle b is $(x \times a)°$, where x is in the range of from 1 to 10, inclusive; and angle c is $(2(b-a)+45)°$.

13. A device as claimed in claim 12, wherein angle a is 6.9° and x=5.

14. A device as claimed in claim 12, wherein the passive optical retarder is disposed between the first linear polarizer and the liquid crystal layer.

15. A device as claimed in claim 12, wherein the liquid crystal layer is disposed between the first linear polarizer and the passive optical retarder.

16. A device as claimed in claim 8, wherein the alignment direction of the first alignment layer and the alignment direction of the second alignment layer are mutually inclined at an angle of 60°±about 15° or 120°±about 15°.

17. A device as claimed in claim 8, wherein the alignment direction of the alignment layer associated with that one of the first and second regions which has the lower pretilt angle is disposed at an angle of 15°±about 15° relative to a polarization or absorption axis of the first linear polarizer.

18. A device as claimed in claim 1, further comprising at least one passive optical retarder having its optic axis inclined with respect to the alignment directions of the first and second alignment layers.

19. A device as claimed in claim 18, wherein the passive retarder defines one of the alignment layers.

20. A device as claimed in claim 18, wherein the passive optical retarder is disposed between the first linear polarizer and the liquid crystal layer.

21. A device as claimed in claim 18, wherein the passive retarder is defined by a liquid crystal layer comprising liquid crystal molecules held in a fixed state.

22. A device as claimed in claim 21, wherein liquid crystal molecules are confined by means of a polymer matrix.

23. A device as claimed in claim 18, wherein the liquid crystal layer is disposed between the first linear polarizer and the passive optical retarder.

24. A device as claimed in claim 18, further comprising a transparent divider in the liquid crystal layer which separates the first and second regions of the liquid crystal layer physically from one another.

25. A device as claimed in claim 24, wherein the transparent divider defines the at least one passive optical retarders.

26. A device as claimed in claim 24, wherein at least one surface of the transparent divider provides a planar or homogeneous alignment.

27. A device as claimed in claim 24, wherein at least one surface of the transparent divider provides a homeotropic alignment.

28. A device as claimed in claim 24, wherein the alignment direction on at least one surface of the divider is inclined with respect to that of the respective alignment layer.

29. A device as claimed in claim 1, further comprising a transparent divider in the liquid crystal layer which separates the first and second regions of the liquid crystal layer physically from one another.

30. A device as claimed in claim 29, wherein at least one surface of the transparent divider provides a planar or homogeneous alignment.

31. A device as claimed in claim 29, wherein at least one surface of the transparent divider provides a homeotropic alignment.

32. A device as claimed in claim 29, wherein the alignment direction on at least one surface of the divider is inclined with respect to that of the respective alignment layer.

33. An assembly of at least two devices as claimed in claim 1.

34. An assembly as claimed in claim 33, wherein the at least two devices include: at least one first device in which liquid crystal molecules in the first and second regions have substantially equal pretilt angles; and a second device in which the liquid crystal molecules in the first and second regions have unequal pretilt angles whereby, when in use, the first and second regions act like optical retarders having different optical retardations.

35. An assembly of at least one device as claimed in claim 1 in combination with another LCD device.

36. An assembly as claimed in claim 35, wherein said another LCD device includes a pi-cell, a Freedericksz-cell, a HAN-cell or a TN cell.

37. A liquid crystal device comprising:
    first and second liquid crystal layers, and
    means for applying a variable voltage across each of the liquid crystal layers,
    wherein the first and second liquid crystal layers are of electrically controllable birefringence and arranged so as to act, when in use, like respective first and second active optically decoupled retarders having in a plane parallel to the first and second liquid crystal layers mutually inclined optic axes and retardations which can be varied within a range to cause color.

38. A device as claimed in claim 37, wherein each of the first and second liquid crystal layers is defined by a respective liquid crystal cell independently selected from a pi-cell, a Freedericksz-cell, a HAN-cell and a TN cell.

39. A twisted liquid crystal device comprising:
    a liquid crystal layer;
    first and second alignment layers disposed on opposite sides of the liquid crystal layer, the first and second alignment layers having respective alignment directions in a plane parallel to the first and second alignment layers which are mutually inclined;
    a first linear polarizer disposed on the opposite side of the first alignment layer to the liquid crystal layer; and
    means for applying a variable voltage across the liquid crystal layer,
    wherein the liquid crystal layer has a twisted nematic liquid crystal structure and is arranged for operation in a surface switching mode with first and second regions of the liquid crystal layer adjacent the first and second alignment layers acting, when in use, like a pair of active optical retarders having mutually inclined optic axes and retardations which can be varied within a range to cause color, wherein liquid crystal molecules in the first and second regions have substantially equal pretilt angles, a second linear polarizer is disposed on the opposite side of the second alignment layer to the liquid crystal layer and has a polarization axis disposed at an angle relative to the alignment direction of the second alignment layer, wherein the device is operated when in use at least in a voltage range in which the active optical retarders exhibit color; and wherein the alignment direction of the second alignment layer is at an angle of substantially $3\beta$ relative to a polarization or absorption axis of the first linear polarizer, where $\beta$ is an angle between the polarization or absorption axis of the first linear polarizer and the alignment direction of the first alignment layer.

40. A twisted liquid crystal device comprising:

a liquid crystal layer;

first and second alignment layers disposed on opposite sides of the liquid crystal layer, the first and second alignment layers having respective alignment directions in a plane parallel to the first and second alignment layers which are mutually inclined;

a first linear polarizer disposed on the opposite side of the first alignment layer to the liquid crystal layer; and means for applying a variable voltage across the liquid crystal layer, wherein the liquid crystal layer has a twisted nematic liquid crystal structure and is arranged for operation in a surface switching mode with first and second regions of the liquid crystal layer adjacent the first and second alignment layers acting, when in use, like a pair of active optical retarders having mutually inclined optic axes and retardations which can be varied within a range to cause color, wherein liquid crystal molecules in the first and second regions have unequal pretilt angles whereby, when in use, the first and second regions act like optical retarders having different optical retardations;

wherein a reflector is disposed on the opposite side of the second alignment layer to the liquid crystal layer; and wherein the alignment direction of the second alignment layer is at an angle of substantially $(2\beta+45°)$ relative to a polarization or absorption axis of the first linear polarizer, where $\beta$ is an angle between the polarization or absorption axis of the first linear polarizer and the alignment direction of the first alignment layer.

41. A twisted liquid crystal device comprising:

a liquid crystal layer;

first and second alignment layers disposed on opposite sides of the liquid crystal layer, the first and second alignment layers having respective alignment directions in a plane parallel to the first and second alignment layers which are mutually inclined;

a first linear polarizer disposed on the opposite side of the first alignment layer to the liquid crystal layer; and means for applying a variable voltage across the liquid crystal layer, wherein the liquid crystal layer has a twisted nematic liquid crystal structure and is arranged for operation in a surface switching mode with first and second regions of the liquid crystal layer adjacent the first and second alignment layers acting, when in use, like a pair of active optical retarders having mutually inclined optic axes and retardations which can be varied within a range to cause color, wherein liquid crystal molecules in the first and second regions have unequal pretilt angles whereby, when in use, the first and second regions act like optical retarders having different optical retardations;

wherein a reflector is disposed on the opposite side of the second alignment layer to the liquid crystal layer; and wherein the device further comprises at least one passive optical retarder having its optic axis inclined with respect to the alignment directions of the first and second alignment layers, wherein the optic axes of the optical retarders are disposed, with respect to the polarization or absorption axis of the first linear polarizer, at angles a, b and c, where angle a is in the range of 20 to 25° inclusive; angle b is $(x+a)°$, where x is in the range of from 1 to 10, inclusive; and angle c is $(2(b-a)+45)°$.

42. A device as claimed in claim 41, wherein angle a is 6.9° and x=5.

43. A device as claimed in claim 41, wherein the passive optical retarder is disposed between the first linear polarizer and the liquid crystal layer.

44. A device as claimed in claim 41, wherein the liquid crystal layer is disposed between the first linear polarizer and the passive optical retarder.

* * * * *